(12) United States Patent
Becker et al.

(10) Patent No.: US 10,561,053 B1
(45) Date of Patent: Feb. 18, 2020

(54) FRAME ASSEMBLY AND ACTUATOR ARRANGEMENT FOR AGRICULTURAL IMGLEMENTS

(71) Applicant: Deere & Company, Moline, IL (US)

(72) Inventors: Shawn J. Becker, Centralia, KS (US);
Andrew J. Peterson, Ankeny, IA (US);
Mark D. Beeck, Ankeny, IA (US);
Jarrod R. Ruckle, Bondurant, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/999,161

(22) Filed: Aug. 15, 2018

(51) Int. Cl.
  *A01B 21/08* (2006.01)
  *A01B 63/24* (2006.01)
  *A01B 63/32* (2006.01)
  *A01B 63/00* (2006.01)

(52) U.S. Cl.
  CPC .......... *A01B 63/245* (2013.01); *A01B 21/086* (2013.01); *A01B 63/004* (2013.01); *A01B 63/32* (2013.01)

(58) Field of Classification Search
  CPC ...... A01B 63/086; A01B 63/32; A01B 63/245
  See application file for complete search history.

(56) References Cited

U.S. PATENT DOCUMENTS

| 4,453,614 A * | 6/1984 | Allen | B62D 53/02 |
| | | | 180/420 |
| 4,723,787 A * | 2/1988 | Hadley | A01B 73/065 |
| | | | 172/311 |
| 2017/0079189 A1* | 3/2017 | Steinlage | A01B 61/044 |
| 2017/0079190 A1 | 3/2017 | Steinlage et al. | |
| 2017/0079197 A1 | 3/2017 | Steinlage et al. | |
| 2018/0153089 A1 | 6/2018 | Sporrer et al. | |

* cited by examiner

*Primary Examiner* — Tara Mayo-Pinnock
(74) *Attorney, Agent, or Firm* — Michael Best & Friedrich, LLP

(57) ABSTRACT

A tillage implement is configured to be towed behind an agricultural vehicle. An implement frame has a first lengthwise frame member, a second lengthwise frame member, and a lateral frame member connected to and extending between the first and second lengthwise frame members. A tool assembly is pivotally connected to the implement frame and includes a ground engaging member. An actuator has a first portion connected to the implement frame and a second portion connected to the tool assembly. Movement of the actuator adjusts the position of the tool assembly relative to the implement frame. The lateral frame member includes an actuator opening and at least a portion of the actuator extends into the actuator opening and the lateral frame member.

20 Claims, 5 Drawing Sheets

… (1)

FRAME ASSEMBLY AND ACTUATOR ARRANGEMENT FOR AGRICULTURAL IMGLEMENTS

FIELD

Various exemplary embodiments relate to tillage equipment.

BACKGROUND

Agricultural implements and machines, such as various plows, tillers, rippers, seeders, nutrient applicators, etc., are used to work soil of crop fields. Tillage and other agricultural implements can perform a variety of tasks, such as breaking up tough ground, injecting nutrients into the ground, and leveling the ground. Such implements are commonly towed behind work vehicles, such as tractors, and can be outfitted with a variety of ground-engaging tools, such as shanks, disks, harrowing tools and finishing tools, depending on the ground preparation operation being carried out.

SUMMARY

According to various embodiments, a tillage implement is configured to be towed behind an agricultural vehicle. An implement frame has a first lengthwise frame member, a second lengthwise frame member, and a lateral frame member connected to and extending between the first and second lengthwise frame members. A tool assembly is pivotally connected to the implement frame. The tool assembly includes a ground engaging member. An actuator has a first portion connected to the implement frame and a second portion connected to the tool assembly. Movement of the actuator adjusts the position of the tool assembly relative to the implement frame. The lateral frame member includes an actuator opening and at least a portion of the actuator extends into the actuator opening and the lateral frame member.

According to another exemplary embodiment, a tillage implement is configured to be towed behind an agricultural vehicle. A main frame has a hitch assembly connectable to a work vehicle. A wing frame is connected to the main frame. The wing frame has a first lengthwise frame member, a second lengthwise frame member, and a lateral frame member connected to and extending between the first and second lengthwise frame members. A tool assembly is pivotally connected to the implement frame. The tool assembly includes a gang frame and a ground engaging member connected to the gang frame. An actuator has a first portion connected to the implement frame and a second portion connected to the gang frame. Movement of the actuator adjusts the position of the tool assembly relative to the implement frame. The lateral frame member includes an actuator opening and at least a portion of the actuator extends into the actuator opening and the lateral frame member.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Various agricultural machines (e.g., seeders, sprayers, primary and secondary tillage implements, and so on) have very wide platforms for mounting various tools or material dispensing components for working crop fields. To allow for transport on roadways, the implements may be formed in sections, one or more of which are able to fold inward alongside or above a main fame of the implement, which has a controlled (e.g., regulated) width or lateral dimension. The sections may be hinged together and pivot with respect to one another between an operational position, in which the outer frame sections are generally parallel with the main frame section, and a transport position, in which the outer sections are folded up and/or over the main frame section. An implement may have as few as one main frame section and one outer section, or it may have several outer sections, such as multiple outer sections on each side of the main frame section.

Figure 1:
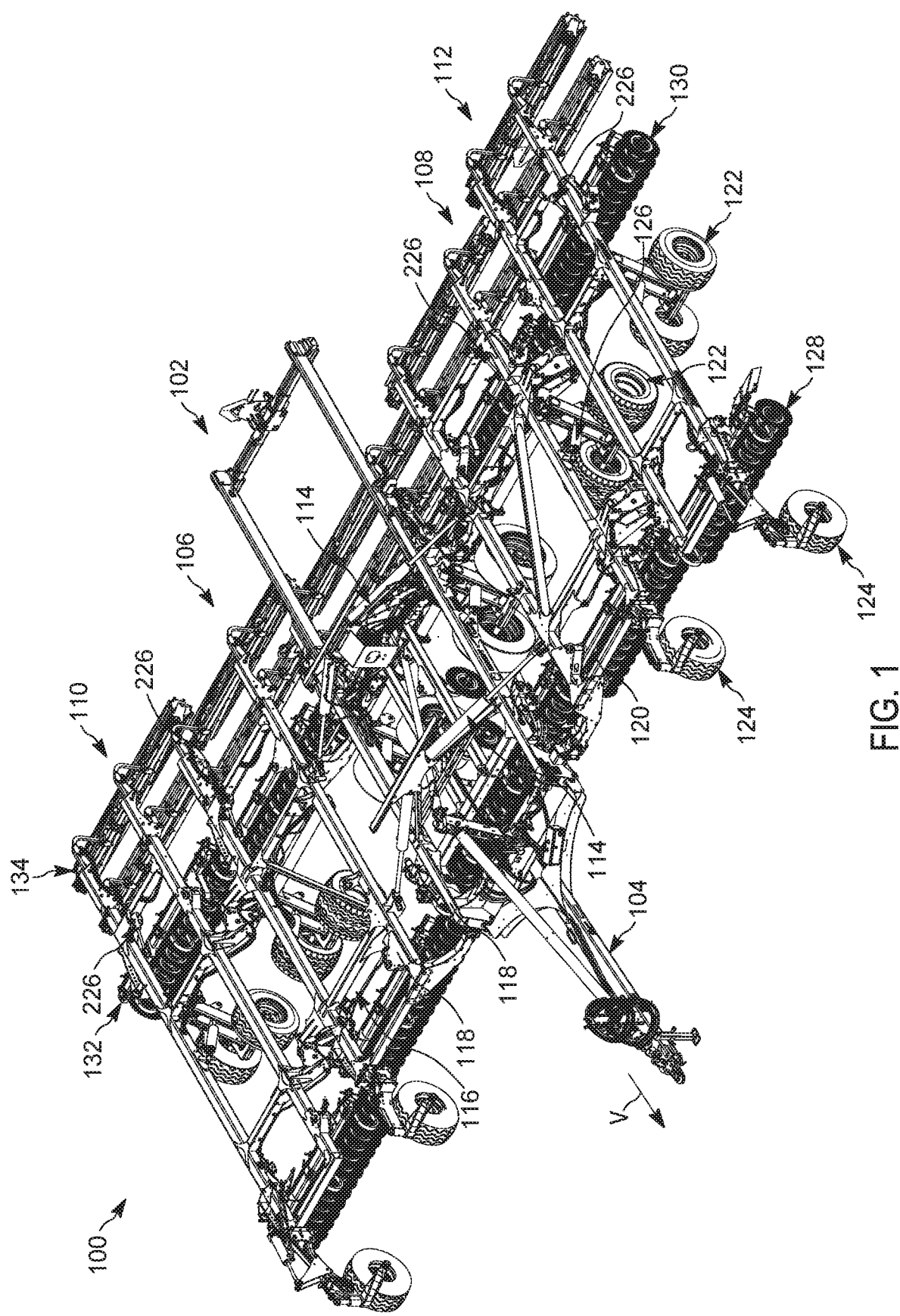
FIG. 1 is a perspective view of an exemplary tillage implement.
Figure 2:
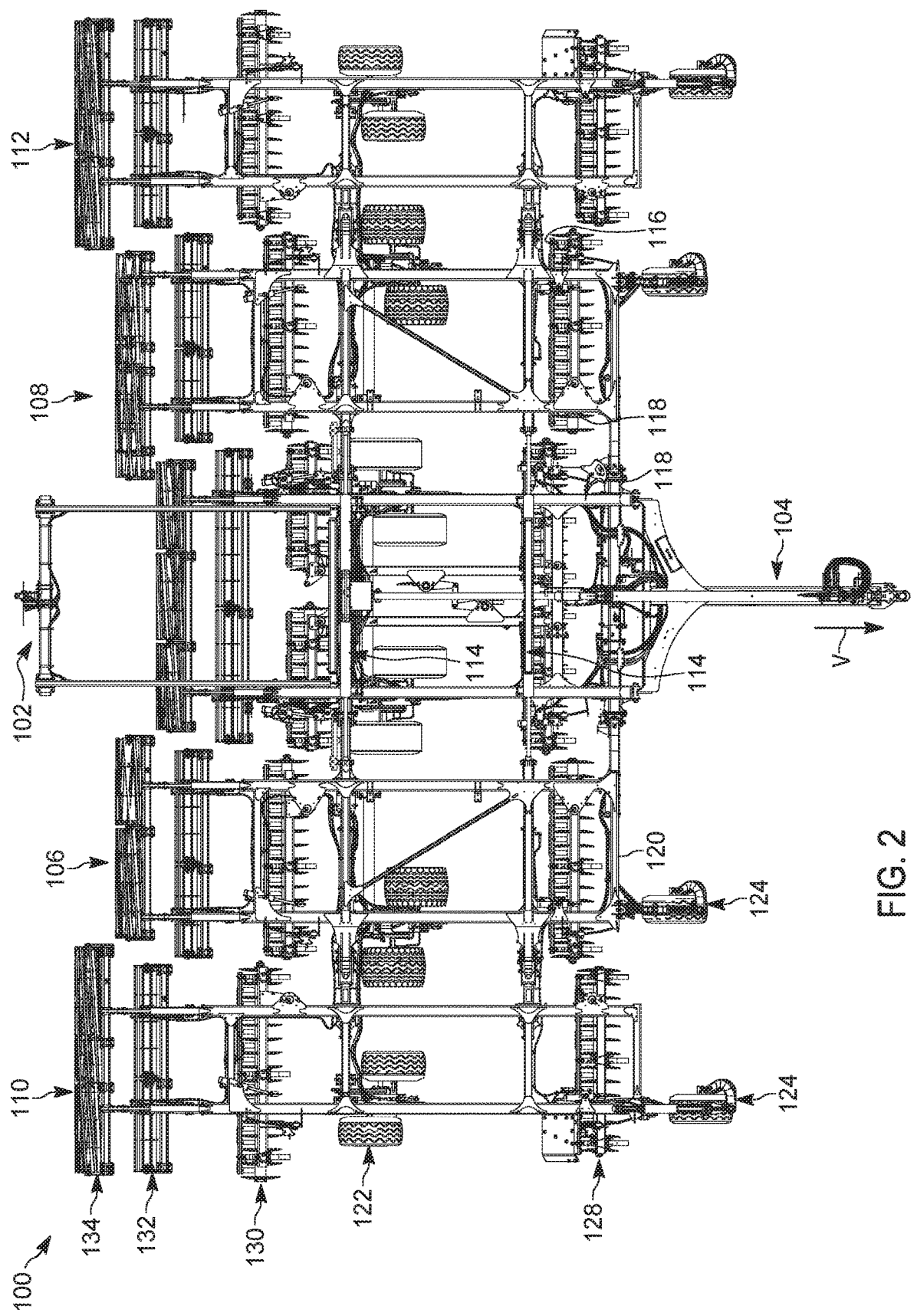
FIG. 2 is a top view of FIG. 1.

FIGS. 1 and 2 illustrate an agricultural implement 100 embodied as a tiller. The implement 100 is designed to couple to a work machine and be moved over an area. For example, the implement 100 can be coupled to a tractor, and dragged behind the tractor over a field. The implement 100 includes work tools that perform different operations, for example aerating the soil before planting or uprooting weeds after planting. Different types of tools can be attached to the implement 100 based on the desired operation.

The agricultural implement 100 includes a main frame 102. The main frame 102 is coupled to a hitch assembly 104, for example a three-point hitch or a drawbar attachment. The hitch assembly 104 extends longitudinally in a direction of travel V for coupling to the work machine.

A plurality of frame sections (i.e. wings) can be connected to the main frame 102. In the illustrated five section configuration, a first inner wing 106, second inner wing 108, first outer wing 110, and second outer wing 112 are connected to the main frame 102. The first inner wing 106 is disposed to one side of the main frame 106, and the second inner wing 108 is disposed on an opposite side of the main frame 102. The first outer wing 110 is disposed to the outside of the first inner wing 106 and the second outer wing 112 is disposed to the outside of the second inner wing 108.

While FIG. 1 represents an illustrated embodiment of an agricultural implement with five frame sections, this disclosure is not limited to this embodiment. Other embodiments may include only three sections with a main frame and two outer frames. Still other embodiments can include only a main frame section without any wing sections. Alternatively, there may be more than five frame sections.

Each frame section can be pivotally coupled to the frame section adjacent thereto. For example, the first inner wing 106 is pivotally coupled to the main frame 102 and the first outer wing 110. Similarly, the second inner wing 108 is pivotally coupled to the main frame 102 and the second outer wing 112. The outer wing sections 110, 112 can fold inward approximately 180 degrees to be positioned on top of the inner wing sections 106, 108, respectively. The inner wing sections 106, 108, and the folded outer wing sections 110, 112, then fold inward approximately 90 degrees so that the inner wings 106, 108 and outer wings 110, 112 are near perpendicular to the main frame 102.

The agricultural implement 100 can include a plurality of actuators for controlling pivoting and folding of the frame sections. Each actuator may be a hydraulic actuator, electric actuator, or any other known actuator. Moreover, each actuator may include an outer body or cylinder in which a rod or piston moves between an extended position and a retracted position. As will be understood, the hydraulic cylinder may be coupled, via various hydraulic fluid carrying lines, to a hydraulic pump on board the towing vehicle. Also on board the towing vehicle may be one or more controllers having processors and memory architecture for controlling the position of various electro-hydraulic valves, which may be connected to the controller(s) directly or by a suitable bus and which control the extension and/or the retraction of the cylinder piston.

The main frame 102 includes a pair of inner wing folding actuators 114. The inner wing folding actuators 114 include cylinders connected to the main frame 102 and pistons connected to one of the inner wing frames. A first set of pistons are connected to the first inner wing 106 and a second set of pistons are connected to the second inner wing 108. Each of the inner wings 106, 108 include a pair of outer wing folding actuators 116. The outer wing folding actuators 116 include cylinders connected to the inner wing frames and pistons connected to one of the outer wing frames. By extending and retracting the respective pistons, the different frame sections can be folded or unfolded as needed.

Each of the frame sections includes a plurality of frame members, such as hollow metal or non-metal tubes or beams. The frame members may be interconnected (e.g. bolted, welded), providing a framework to which an array of tillage tools and other components may be mounted. In the example shown, the frame sections include a pair of spaced lengthwise frame members 118 having a length extending in the direction of travel V and two or more lateral frame members 120 coupled to, and extending between, the lengthwise frame members 118. The lateral frame members 120 can extend substantially parallel to the direction of travel V. The size and spacing of the frame members can vary depending on the desired length and width of the implement.

Each of the frame sections can be supported by one or more wheels. For example, the implement 100 can utilize one or more sets of center wheels 122 and one or more front wheels 124. In the illustrated embodiment, two sets of center wheels 122 are connected to the lengthwise frame members 118 of the main frame 102, a single set of center wheels 122 are connected to each of the inner wings 106, 108 and the outer wings 110, 112, and a front wheel is connected to each of the inner frames and outer frames. In some embodiments, there may be only a single wheel supporting each frame section. In a different embodiment, there may be more than a pair of wheels supporting each frame section. Moreover, there may be back wheels disposed near the rear of the implement for additional support.

Height adjustment actuators 126 are used to control the height of the frame sections relative to the center wheels 122, and thus adjust the height of the frame section relative to the ground. The height adjustment actuators 126 have a cylinder connected to the respective frame section and a piston connected to a mounting arm associated with the center wheels 122. Extension and retraction of the cylinder raises or lowers the wheels 122 relative to the respective frame section. The height adjustment actuators 122 are dual-acting hydraulic actuators, although other known actuators can be used. As discussed above, the height adjustment actuators 122 can be coupled to a pump via various hydraulic fluid carrying lines, and controlled by one or more controllers.

A plurality of tool assemblies are coupled to the frame sections for engaging a ground surface or soil upon which the implement 100 travels. The illustrated embodiment includes a first set of disk harrow gang assemblies 128, a second set of disk harrow gang assemblies 130, a first roller basket assembly 132, and a second roller basket assembly 134 attached to each frame section. Different tool assemblies, including tillers and rank tines, can also be connected to the frame sections. The tools can be releasably secure to the frame section so that different tools can be swapped in and out as needed.

Figure 3:
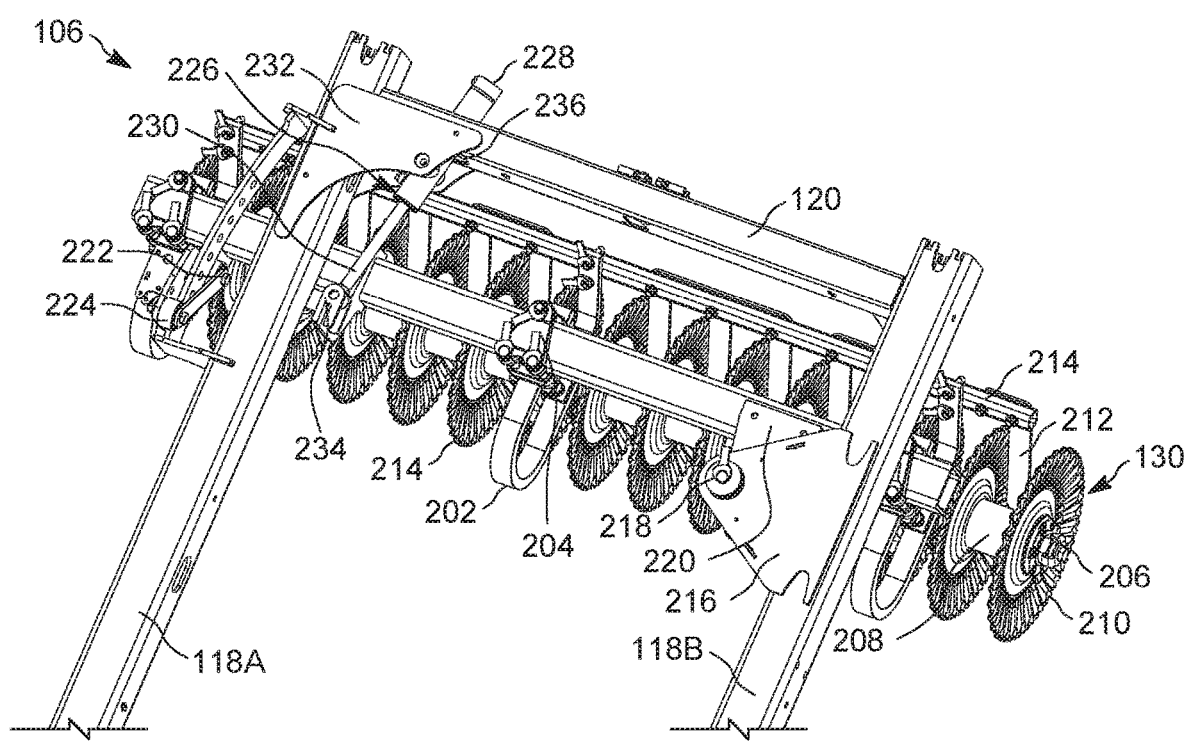
FIG. 3 is a perspective view of a portion of an inner wing section shown in FIG. 1.
Figure 4:
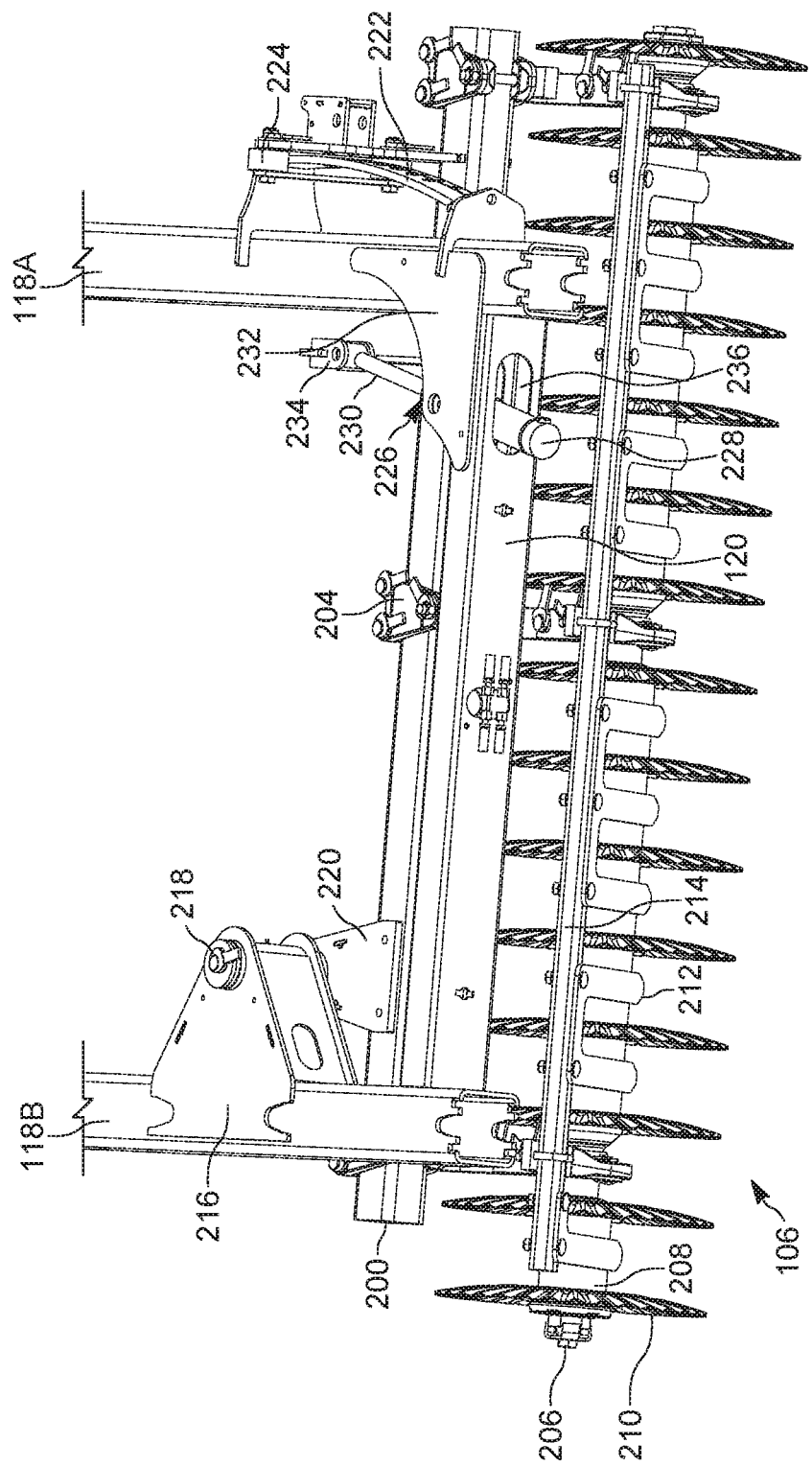
FIG. 4 is a rear perspective view of FIG. 3.

FIGS. 3 and 4, show a detailed view of the rear disk harrow gang assembly 130 connected to the first inner wing 106. The first inner wing includes a first lengthwise frame member 118A and a second lengthwise frame member 118B. A rear lateral frame member 120 extends between and is connected to the first and second lengthwise frame members 118A, 118B. The inner wing 106 includes additional components as shown in FIGS. 1 and 2 and as would be understood by one of ordinary skill in the art.

The disk harrow gang assembly 130 includes a gang frame 200. A plurality of C-shaped spring hangers 202 are connected by brackets 204 to the gang frame 200. Bearings are connected to the lower ends of the respective hangers 202 to rotatably support a gang bolt 206 with spools 208 and disk blades 210. A plurality of scrapers 212 are supported from a transverse tubular beam 214 carried rearwardly of the gang frame 200.

The disk harrow gang assembly 130 is shown as extending substantially perpendicular to the direction of travel V of the work implement 100 and substantially parallel to the lateral frame member 120. The gang frame 200 is pivotally connected to the inner wing 106 so that the angle of the disk harrow gang assembly 130 can be adjusted by a user in order to set or maintain a desired amount of soil turning during operation. The angle can be adjusted, for example, from zero degrees (shown) to approximately twelve degrees relative to the lateral frame member 120.

A first end of the disk harrow gang assembly is connected to a pivot bracket 216 attached to the frame of the first inner wing 106. The pivot bracket 216 is connected to one of the lengthwise frame members 118B. A pin 218 extends through the pivot bracket 216. A pivot arm 220 extends from the gang frame 200 to connect to the pin 218, which defines an axis of rotation for the disk harrow gang assembly 130. The second end of the disk harrow gang assembly is moveable connected to a support arm 222 by a roller assembly 224.

A tilt actuator 226 is connected to the frame of the first inner wing 106 and to the gang frame 200 to adjust the angle of the disk harrow gang assembly 130. The tilt actuator 226 includes a cylinder 228 connected to the first inner wing frame and a piston 230 connected to the gang frame 200. An actuator bracket 232 is connected to the first lengthwise frame member 118A and/or the lateral frame member 120 and to the cylinder 228. As shown, the cylinder 228 can be pivotally connected to the actuator bracket 232 at a position forward of the lateral frame member 130. The piston 230 is pivotally connected to the gang frame 200 by a piston bracket 234 utilizing, for example, a clevis yoke and pin connection. The piston 230 can be extended and retracted by a user, rotating the gang frame 200, and thus the disk harrow assembly 130, about the axis A of the pivot bracket 216. In an exemplary embodiment, the tilt actuator 226 is a dual-acting hydraulic actuator, although other known actuators can be used. The tilt actuator 226 can be coupled to a pump via various hydraulic fluid carrying lines, and controlled by one or more controllers.

Figure 5:
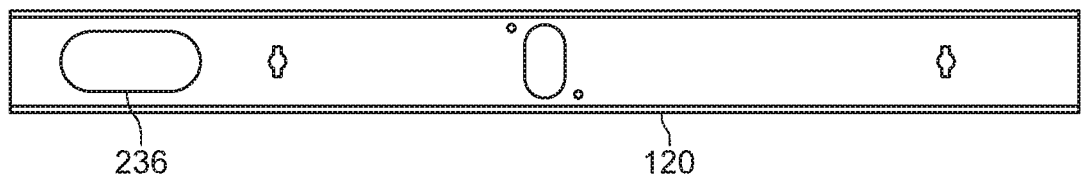
FIG. 5 is a front view of a lateral frame member of the inner wing section of FIG. 3.

As shown in FIGS. 3-5 the lateral frame member 120 includes an actuator opening 236. The actuator opening receives at least a portion of the tilt actuator 226. In an exemplary embodiment, that actuator opening 236 extends through the frame member 120 and the cylinder 228 of tilt actuator 226 extends through the actuator opening 236 and includes a rear end positioned behind the lateral frame member 120. When a hollow frame member is used, the actuator opening 236 can include a front section positioned in a front wall of the frame member and a rear section positioned in a rear wall of the frame member. In other embodiments, the tilt actuator 226 can extend into, but not through the lateral frame member 120 and the actuator opening 236 can have a closed or blind end.

The actuator opening is configured so that it is larger than the received portion of the tilt actuator 226, for example the cylinder 228. This allows the actuator to move (e.g. rotate) with respect to the lateral frame member 120 and to accommodate for connections and other components (e.g. hydraulic lines) to extend through the actuator opening. In an exemplary embodiment, the actuator opening 236 has an obround configuration, which provides significant area for the cylinder to pivot in the opening, while also allowing for enough structural integrity for the lateral frame member 120. In certain embodiments, the length of the obround actuator opening 236 is at least 1.5 times the width or diameter of the cylinder 228 and the height of the actuator opening 236 is larger than height or diameter of the cylinder 228.

The tilt actuator 226 is oriented at an oblique angle to the gang frame 200 when the gang frame 200 is at a neutral angle, perpendicular to the direction of travel V and the lengthwise frame members 118A, 118B. In an exemplary embodiment, the connection between the piston 230 and the piston bracket 234 is positioned closer to the first lengthwise frame member 118A than the connection between the cylinder 228 and the actuator bracket 232. This results in the cylinder 228 extending into the actuator opening 226 at an oblique angle relative to the lateral frame member 120.

As best shown in FIGS. 1 and 2, the first and second inner wings 106, 108, and the first and second outer wings 110, 112 can include tilt actuators 226 extending through the lateral frame members 120 for the rear disk harrow gang assemblies 130. In other embodiments, additional or fewer actuators can extend through frame members.

Positioning the tilt actuator 226 through the frame provides a number of advantages to typical configurations which place the actuator in front of the frame. The actuator is better protected from external forces and contaminants, such as debris that could strike the tilt actuator 226 or loads that may be inadvertently placed on the tilt actuator 226. Additionally, the overall length of the frame can be reduced because the full range of the actuator does not need to be accommodated on the outside of, or in front of, the lateral frame member 120.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A tillage implement configured to be towed behind an agricultural vehicle, the tillage implement comprising:
    an implement frame having a first lengthwise frame member, a second lengthwise frame member, and a lateral frame member connected to and extending between the first and second lengthwise frame members;
    a tool assembly pivotally connected to the implement frame, the tool assembly including a ground engaging member; and
    an actuator having a first portion connected to the implement frame and a second portion connected to the tool assembly,
    wherein movement of the actuator adjusts the position of the tool assembly relative to the implement frame, and
    wherein the lateral frame member includes an actuator opening and at least a portion of the actuator extends into the actuator opening and the lateral frame member.

2. The tillage implement of claim 1, wherein the actuator opening extends through the lateral frame member and at least a portion of the actuator extends through the actuator opening.

3. The tillage implement of claim 1, wherein the first portion of the actuator includes a cylinder connected to the implement frame and the second portion of the actuator includes a piston connected to the tool assembly.

4. The tillage implement of claim 3, wherein the cylinder is connected to the first lengthwise frame member by an actuator bracket.

5. The tillage implement of claim 1, wherein the tool assembly includes a gang frame member, and wherein the actuator is connected to the gang frame member.

6. The tillage implement of claim 5, wherein the actuator is connected to the tool assembly by a piston bracket that extends in front of the gang frame member.

7. The tillage implement of claim 1, wherein the tool assembly is a disk harrow gang assembly.

8. The tillage implement of claim 1, wherein the actuator includes a dual-acting hydraulic actuator.

9. The tillage implement of claim 1, wherein the actuator opening is sized to permit movement of the actuator.

10. A tillage implement configured to be towed behind an agricultural vehicle, the tillage implement comprising:
    a main frame having a hitch assembly connectable to a work vehicle;
    a wing frame connected to the main frame, the wing frame having a first lengthwise frame member, a second lengthwise frame member, and a lateral frame member connected to and extending between the first and second lengthwise frame members;

a tool assembly pivotally connected to the wing frame, the tool assembly including a gang frame and a ground engaging member connected to the gang frame; and an actuator having a first portion connected to the wing frame and a second portion connected to the gang frame, wherein movement of the actuator adjusts the position of the tool assembly relative to the wing frame, and wherein the lateral frame member includes an actuator opening and at least a portion of the actuator extends into the actuator opening and the lateral frame member.

11. The tillage implement of claim 10, wherein the gang frame is pivotally connected to the wing frame by a pivot bracket.

12. The tillage implement of claim 10, wherein the ground engaging member includes a rotatable disk.

13. The tillage implement of claim 10, wherein the actuator includes a cylinder connected to the wing frame and an extendable piston connected to the gang frame.

14. The tillage implement of claim 13, wherein the cylinder is connected to an actuator bracket at a position forward of the lateral frame member.

15. The tillage implement of claim 10, wherein the actuator opening extends through the lateral frame member and at least a portion of the actuator is positioned to the rear of the lateral frame member.

16. The tillage implement of claim 10, wherein the actuator extends through the actuator opening at an oblique angle to the lateral frame member.

17. The tillage implement of claim 16, wherein the piston extends away from the main frame.

18. The tillage implement of claim 10, wherein the actuator opening has an obround configuration.

19. The tillage implement of claim 10, wherein the actuator includes a dual-acting hydraulic actuator.

20. The tillage implement of claim 10, wherein the wing frame is pivotally connected to the main frame.

* * * * *